(12) United States Patent
Teodosiu et al.

(10) Patent No.: US 8,108,548 B2
(45) Date of Patent: Jan. 31, 2012

(54) METHODOLOGY AND SYSTEM FOR FILE REPLICATION BASED ON A PEERGROUP

(75) Inventors: Dan Teodosiu, Kirkland, WA (US); Ravi T. Rao, Redmond, WA (US); Ryan Y. Kim, Sammamish, WA (US); Sandeep K. Singhal, Kirkland, WA (US); Todd R. Manion, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 877 days.

(21) Appl. No.: 11/316,073

(22) Filed: Dec. 22, 2005

(65) Prior Publication Data

US 2007/0150558 A1 Jun. 28, 2007

(51) Int. Cl.
  *G06F 15/173* (2006.01)
  *G06F 15/16* (2006.01)
(52) U.S. Cl. .................. 709/238; 709/229; 709/243
(58) Field of Classification Search .................. 709/238
   See application file for complete search history.

(56) References Cited

U.S. PATENT DOCUMENTS

| | | | |
|---|---|---|---|
| 6,725,281 B1 | 4/2004 | Zintel et al. | |
| 6,779,004 B1 | 8/2004 | Zintel | |
| 6,848,109 B1 * | 1/2005 | Kuhn | 719/315 |
| 6,892,230 B1 | 5/2005 | Gu et al. | |
| 7,103,586 B2 * | 9/2006 | Holenstein et al. | 707/1 |
| 7,263,111 B1 * | 8/2007 | Davis et al. | 370/522 |
| 7,296,237 B2 * | 11/2007 | Crocker et al. | 715/750 |
| 7,418,494 B2 * | 8/2008 | Dahlin et al. | 709/224 |
| 2001/0039548 A1 * | 11/2001 | Shinkai et al. | 707/201 |
| 2002/0027569 A1 | 3/2002 | Manni et al. | |
| 2002/0032769 A1 * | 3/2002 | Barkai et al. | 709/224 |
| 2002/0112058 A1 | 8/2002 | Weisman et al. | |
| 2002/0114341 A1 * | 8/2002 | Sutherland et al. | 370/428 |
| 2002/0143989 A1 | 10/2002 | Huitema et al. | |
| 2003/0023712 A1 * | 1/2003 | Zhao et al. | 709/223 |
| 2003/0055892 A1 * | 3/2003 | Huitema et al. | 709/204 |
| 2003/0097425 A1 | 5/2003 | Chen | |
| 2003/0117433 A1 | 6/2003 | Milton et al. | |
| 2003/0188156 A1 * | 10/2003 | Yasala et al. | 713/156 |
| 2004/0002049 A1 * | 1/2004 | Beavers et al. | 434/350 |
| 2004/0071137 A1 * | 4/2004 | He et al. | 370/390 |
| 2004/0111441 A1 * | 6/2004 | Saito et al. | 707/200 |
| 2004/0111469 A1 | 6/2004 | Manion et al. | |
| 2004/0111515 A1 | 6/2004 | Manion et al. | |
| 2004/0128341 A1 * | 7/2004 | Synek et al. | 709/200 |
| 2004/0139396 A1 * | 7/2004 | Gelernter et al. | 715/515 |
| 2004/0148333 A1 | 7/2004 | Manion et al. | |
| 2004/0190549 A1 | 9/2004 | Huitema | |

(Continued)

OTHER PUBLICATIONS

"Teredo Overview," Microsoft Corporation, website, 30 pages available at http://www.microsoft.com/technet/prodtechnol/winxppro/maintain/teredo.mspx, © 2003 Microsoft Corporation.

(Continued)

*Primary Examiner* — Abdullahi Salad
*Assistant Examiner* — Richard G Keehn (57) ABSTRACT

The claimed invention adapts an existing operating system native replication service component to interface with a general application running on a peer-to-peer network. The claimed invention provides the general application with replication services without the need for coding this functionality from scratch. The claimed invention also adapts the replication service functionality to create a topology of connections based on information received from a peer-to-peer network component, thereby making the replication service function more efficiently with a peer-to-peer network.

18 Claims, 10 Drawing Sheets

U.S. PATENT DOCUMENTS

| | | | |
|---|---|---|---|
| 2004/0225952 A1* | 11/2004 | Brown et al. | 714/819 |
| 2004/0249907 A1 | 12/2004 | Brubacher et al. | |
| 2004/0255029 A1 | 12/2004 | Manion et al. | |
| 2004/0260800 A1 | 12/2004 | Gu et al. | |
| 2005/0004916 A1 | 1/2005 | Miller et al. | |
| 2005/0022210 A1 | 1/2005 | Zintel et al. | |
| 2005/0074018 A1 | 4/2005 | Zintel et al. | |
| 2005/0091529 A1 | 4/2005 | Manion et al. | |
| 2005/0094572 A1* | 5/2005 | Mimura et al. | 370/252 |
| 2005/0097503 A1 | 5/2005 | Zintel et al. | |
| 2005/0108371 A1 | 5/2005 | Manion et al. | |
| 2005/0132070 A1* | 6/2005 | Redlich et al. | 709/228 |
| 2005/0177715 A1 | 8/2005 | Somin et al. | |
| 2005/0262132 A1* | 11/2005 | Morita et al. | 707/102 |
| 2006/0098664 A1* | 5/2006 | De Dona | 370/401 |
| 2006/0120384 A1* | 6/2006 | Boutboul et al. | 370/400 |
| 2006/0165087 A1* | 7/2006 | Page et al. | 370/395.3 |

OTHER PUBLICATIONS

The Cable Guy, "Windows Peer-to-Peer Networking: The Cable Guy—Nov. 2003," updated Aug. 5, 2004, Microsoft TechNet, 7 pages.

D. Box, "Code Name Indigo: A Guide to Developing and Running Connected Systems With Indigo," dated Jan. 2004, MSDN Magazine, 11 pages.

D. Chappell, "Introducing Indigo: An Early Look," (Longhorn Technical Articles) dated Feb. 2005, Microsoft.com Library, 18 pages.

"Peer-to-Peer Infrastructure: PeerGroupEnumMembers," Microsoft, http://msdn.microsoft.com/library/en-us/p2psdk/p2p/peergroupenummembers.asp?frame=true.

"Peer-to-Peer Infrastructure: Identity Manager Functions," Microsoft, http://msdn.microsoft.com/library/en-us/p2psdk/p2p/identity_manager_functions.asp?frame.

"Peer-to-Peer Infrastructure: Creating a Group Chat Application," Microsoft, http://msdn.microsoft.com/library/en-us/p2psdk/p2p/creating_a_group_chat_application.asp....

"Peer-to-Peer Infrastructure: Grouping API Functions," Microsoft, http://msdn.microsoft.com/library/en-us/p2psdk/p2p/grouping_api_functions.asp?frame=true.

* cited by examiner

METHODOLOGY AND SYSTEM FOR FILE REPLICATION BASED ON A PEERGROUP

BACKGROUND

Peer-to-peer (P2P) systems employ a network of nodes that communicate with each other in a decentralized manner, e.g., without the aid of a central server. Each node (e.g., an application or a device) in the peer-to-peer network may communicate with another node on the network through a direct connection, or each node may communicate indirectly using an intermediary node to relay communications to an intended node. Peer-to-peer networks may be created using a p2p component, such as an application program interface (API), that provides basic peer-to-peer functionality, e.g., graph creation functions, network maintenance functions, message flooding, transport protocols, etc. Thus, an application using a peer-to-peer API may, for example, create a peer-to-peer network, connect to the P2P network, and communicate with other nodes in the network using the functions provided by the peer-to-peer API.

Applications using a peer-to-peer network may require replication services. For example, a meeting application for facilitating communications over a peer-to-peer network between participants may need to share files between the participants. Instead of creating a new file replication service, some operating systems contain a file replication services component which may be used to provide replication services to an application. However, the file replication services component may not be designed to work efficiently with an application running on a peer-to-peer schema. For example, some file replication services components may be designed to use a domain model to establish connections and provide security for replication members. Moreover, the existing file replication services components may not establish an efficient connection topology for use with a meeting application that performs other communication processes using a peer-to-peer network.

SUMMARY

A software application, such as a meeting application, may be used to facilitate communications between members connected by a peer-to-peer (p2p) network, where the members participating in the meeting is a peer group. One feature of a meeting application may be a replication service in which each member shares a common set of files. Some operating systems provide a native file replication service (FRS) component that enables a set of devices connected by a network to replicate the set of files between them, but may not be suited for a p2p network. The claimed method and system adapts the native file replication service to be used by a general application, such as a meeting application, running on a peer-to-peer network. Moreover, the FRS is adapted to work with the general applications to create an efficient replication topology based on a topology of the peer-to-peer network. Thus, the general application interfaces with the FRS component to provide replication services using a topology from p2p.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
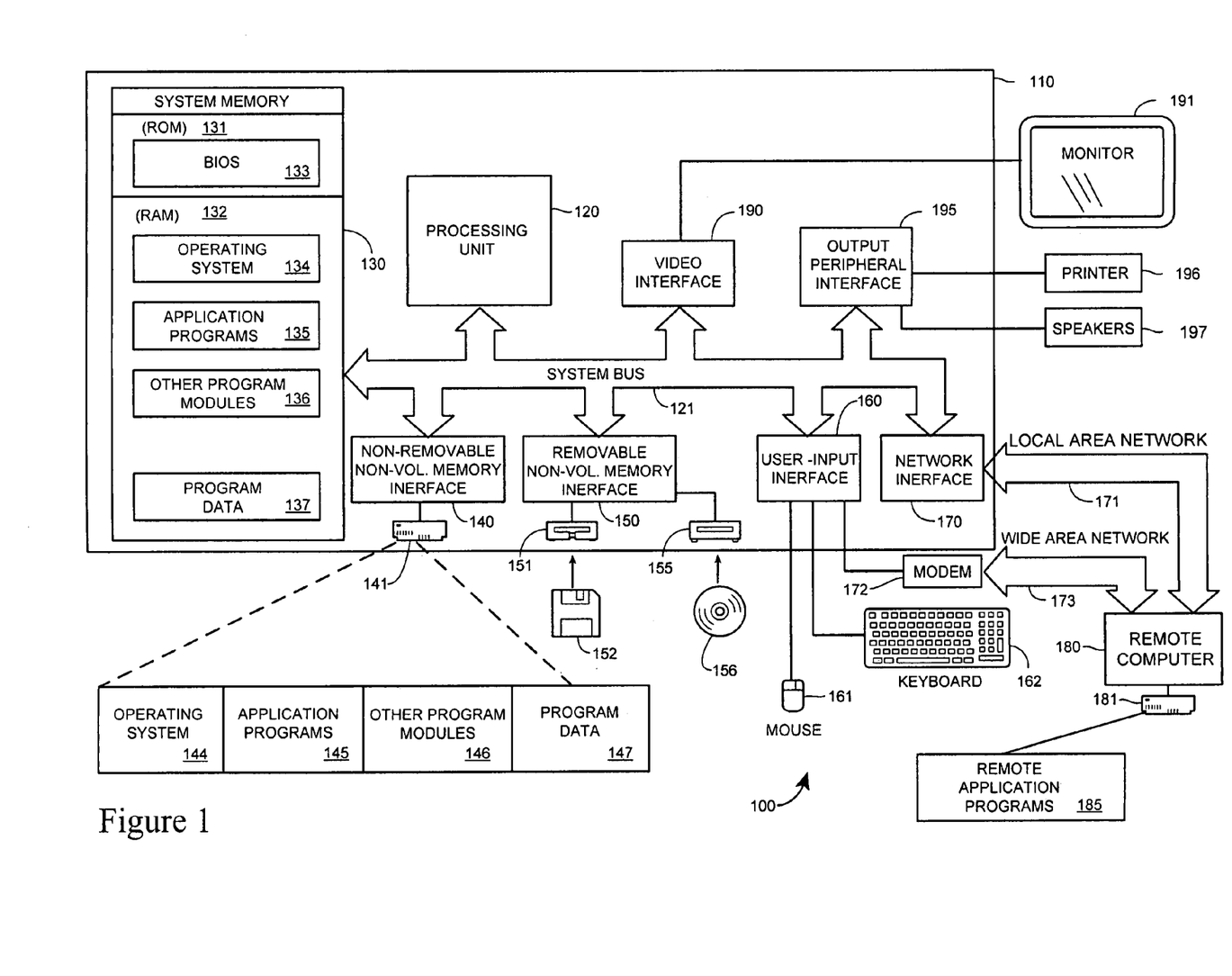
FIG. 1 illustrates an exemplary computer environment for implementing aspects of the claimed system.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media may be any available media that may be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components may either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections illustrated are exemplary and other means of establishing a communications link between the computers may be used.

Figure 2:
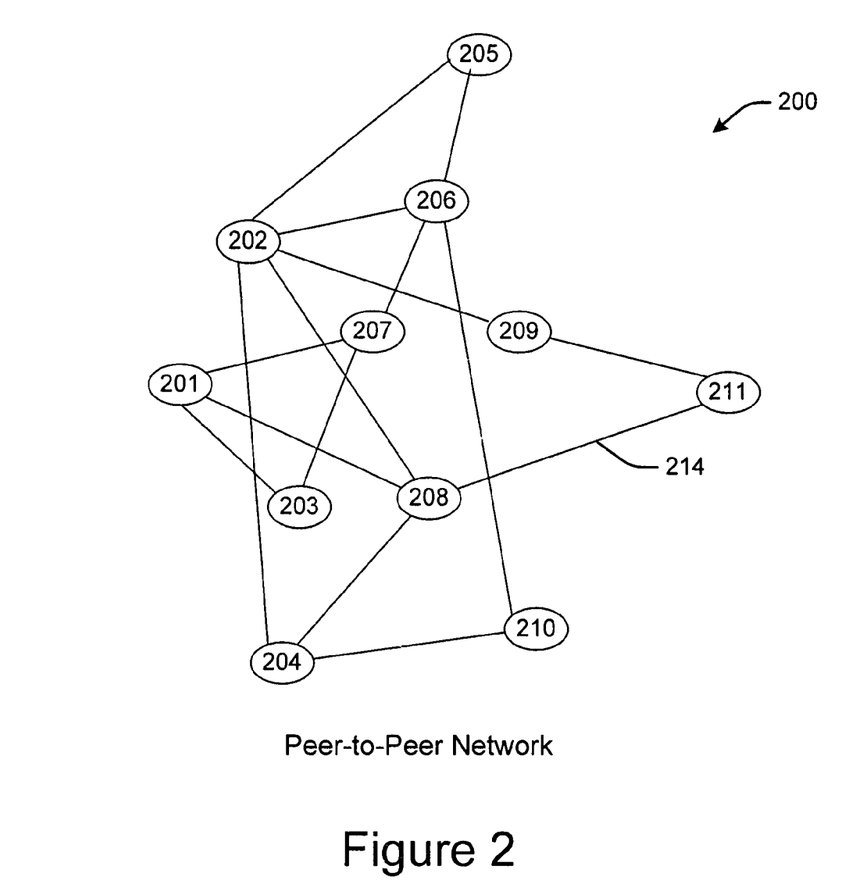
FIG. 2 illustrates a conventional peer-to-peer (P2P) system.

Peer-to-peer (p2p) systems employ a network that connects participating entities together in a decentralized manner. That is, in a p2p system, a first participant may be directly coupled to a second participant or the first participant may be coupled to the second participant through a chain of one or more intermediate participants. A peer entity may be a device, such as a computer, an application, and/or any resource that may interact with a network. FIG. 2 illustrates a high-level depiction of a p2p system 200. The system 200 includes a collection of peer entities (201-211). The peer entities (201-211) may be personal computer devices that are coupled together via any network or combination of networks (such as the Internet). FIG. 2 illustrates an example in which each peer entity (201-211) is directly connected to all other peer entities (201-211). In other cases, one or more peer entities (201-211) may only be connected to other peer entities (201-211) via one or more intermediary participants (202-212), e.g., in an indirect connection.

Peer-to-peer networks, or graphs, operate using some basic functionality. For example, any pair of directly connected peer entities (201-211) may directly transfer information between themselves (as indicated by the exemplary communication path 214 between peer entity 211 and peer entity 208). Any pair of indirectly connected peer entities (201-211) may transmit information between themselves via one or more intermediary peer entities (201-211) (which act to relay the information). These functions allow any two peer entities (201-211) to exchange information without the aid of a server (or with only minimal set-up tasks performed by the server). The P2P system 200 may also include multicasting functionality for disseminating information to a plurality of peer entities.

A peer-to-peer system may be implemented using a peer-to-peer functionality component, such as an application program interface ("API"), which provides general p2p network functionality. Thus, a p2p API may be used to define a group of nodes that represent participants of a P2P network. Collectively, the nodes represent an interconnected mesh, or "graph," according to the terminology used hereinafter. The p2p API functionality may further include functions for creating and initializing a graph, monitoring a graph, maintaining graph integrity, message flooding, general message management, etc. The p2p API may also include a native transport function that provides an actual physical connection between the nodes in a graph.

Figure 3:
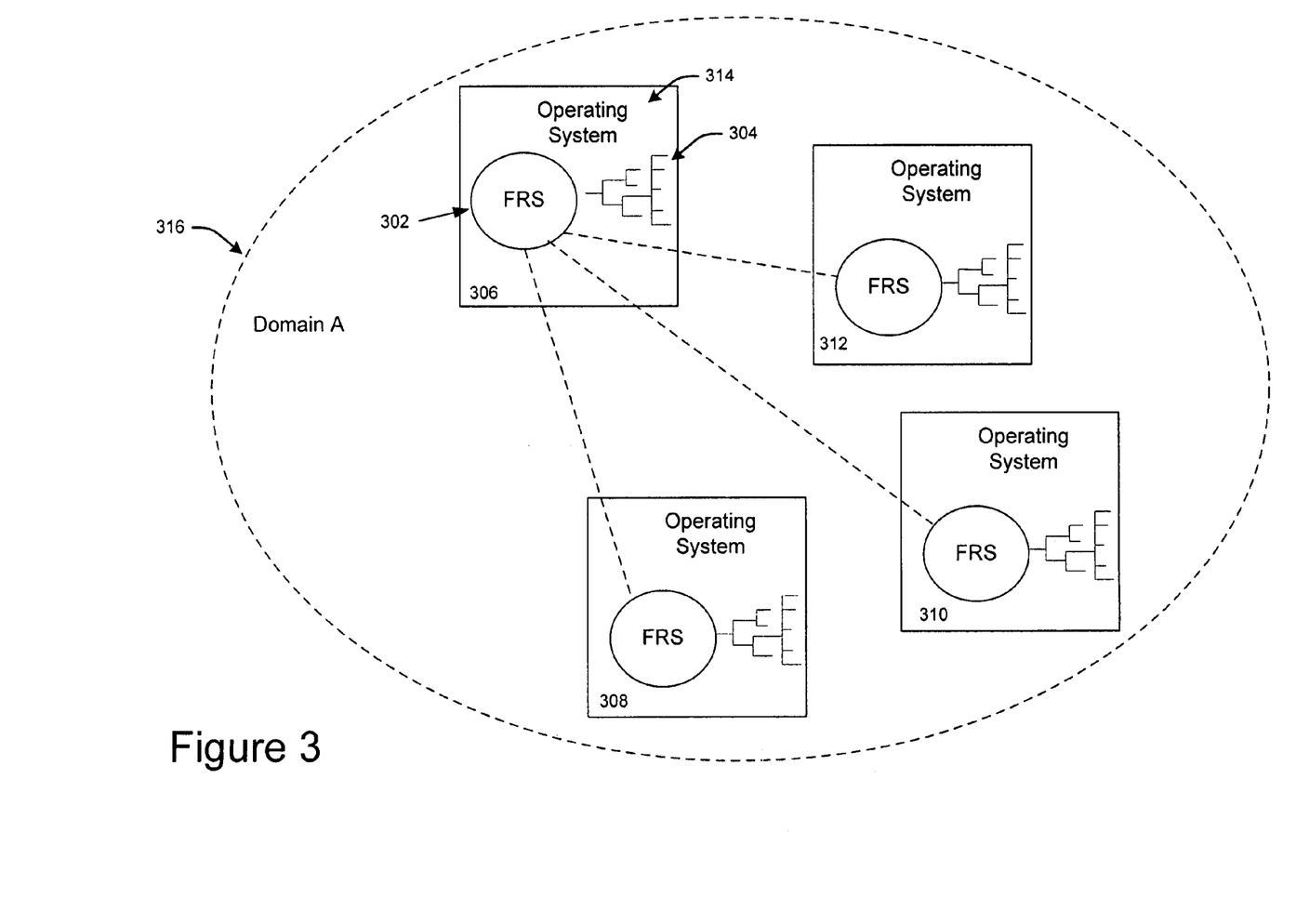
FIG. 3 illustrates a general file replication component as part of an operating system.

FIG. 3 may illustrate a general file replication service (FRS) system. A file replication service component 302 generally maintains identical sets of files and directories 304 on different devices 306-312 (e.g., servers, workstations, etc.) connected to a network and running on a common operating system 314. Sometimes the devices may not be running on common operating systems but may have an FRS component running on the devices. When files are updated on one server, the file replication service replaces the corresponding files on other servers and workstations with the updated files. In addition, the FRS can resolve file and folder conflicts to make data consistent among servers. The replication process simplifies the task of updating and coordinating files, and maintains the integrity of the replicated data.

Figure 4:
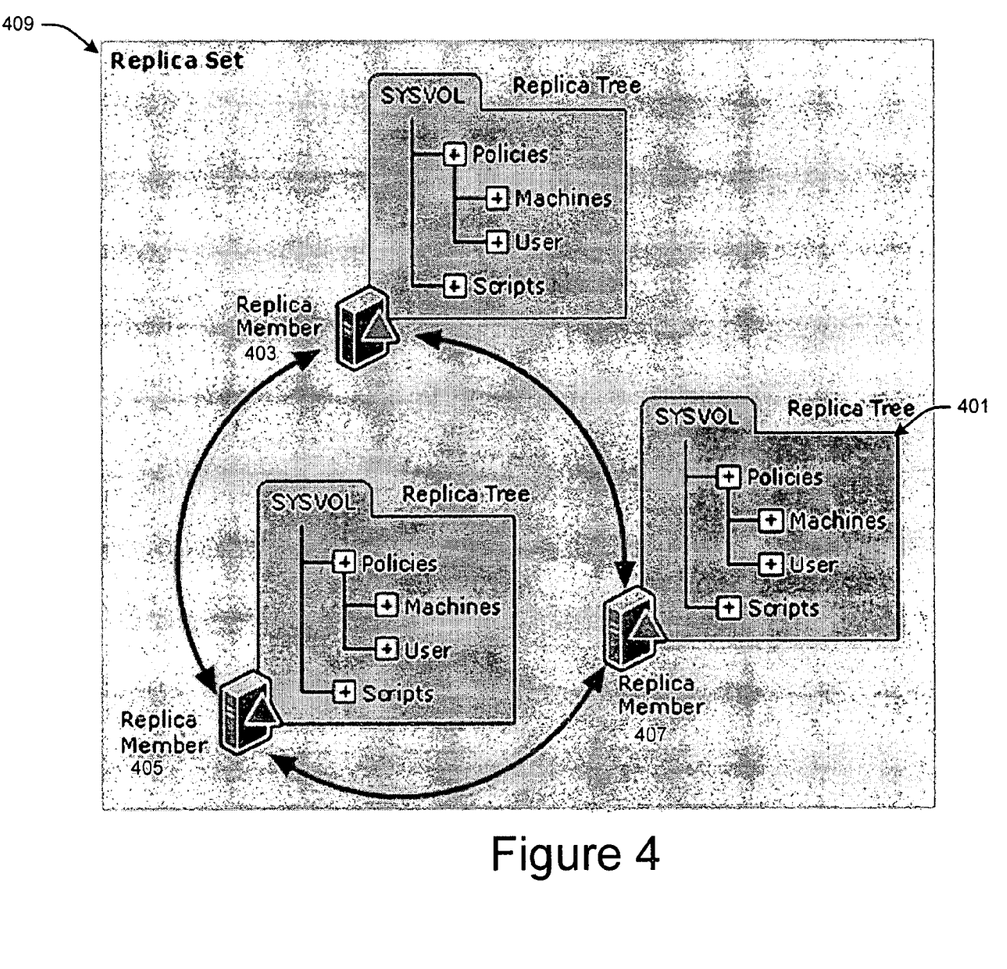
FIG. 4 illustrates a ring topology for a general file replication system.

An FRS system may be further illustrated by the replication process of FIG. 4. The set of data to be replicated to all servers is known as the replica tree 401, and the servers to receive this replica tree are known as replica members 403, 405, 407. The group of replica members 403, 405, 407 that participates in the replication of a given replica tree is known as a replica set 409. Replica members are connected in a topology, which is a framework of connections between servers and defines a replication path. There are a number of common topologies, such as full mesh, ring, and hub and spoke. FIG. 4 is an example of a ring topology, where the replication path is a closed ring.

Figure 5:
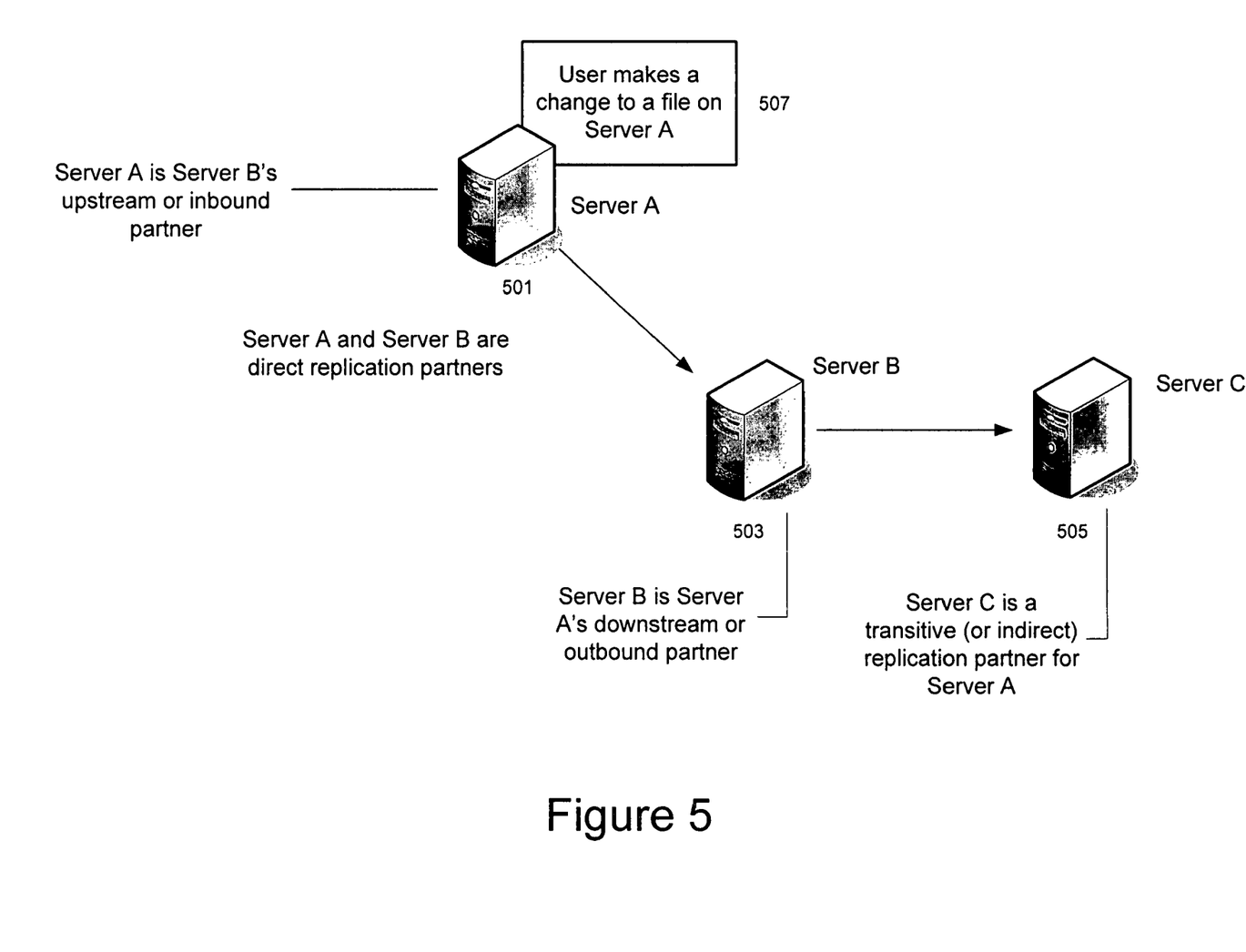
FIG. 5 illustrates a file replication process involving three replication members.

FIG. 5 illustrates a replication process between three devices that are connected serially. In this embodiment any two replica members with a direct connection between them are known as direct replication partners. In FIG. 5, Server A 501 and Server B 503 are direct replication partners, as are Server B 503 and Server C 505. Although changes that originate on Server A 501 are eventually replicated to Server C 505, these two servers have an indirect connection to each other, so they are known as transitive replication partners. When a changed file or folder is received on a server, either because the change originated there or because the server received the file or folder from another partner, that server becomes the upstream partner (also known as inbound partner) for any direct replication partner that has not yet received the change. For example, in FIG. 5, a change 507 originates on Server A 501, and Server A 501 is considered the upstream or inbound partner for Server B 503. Server B 503 is considered the downstream (also known as outbound) partner for Server A 501. Some FRS components may implement a pull model in which a local instance of the FRS holds a reference to other machines' shared directories and advertises changes to its own shared directory. The callbacks, e.g., the advertised changes, may prompt the local FRS to pull down the revisions from the advertising node or machine.

The file replication service (FRS) may operate by using a domain, such as a windows NT domain, created by a network administrator. The domain may contain a list of users (e.g., servers, workstations, etc.) that belong to the domain and have rights to read from and write to objects in the domain. Devices 306-312 may belong to a Domain A 316 in FIG. 3. Some FRS components may rely on a network directory service requiring the domain or workgroup to authenticate the devices running the FRS. For example, the devices in FIGS. 3-5 may all need to have the same domain credentials to be authenticated. After being authenticated, FRS may then operate to manage replication of a designated shared directory, where the FRS could automatically replicate content changes (e.g., additions, deletions, modifications) from corresponding directories of other machines in the domain. In short, some FRS components replicates files across different devices belonging to the same domain.

Figure 6:
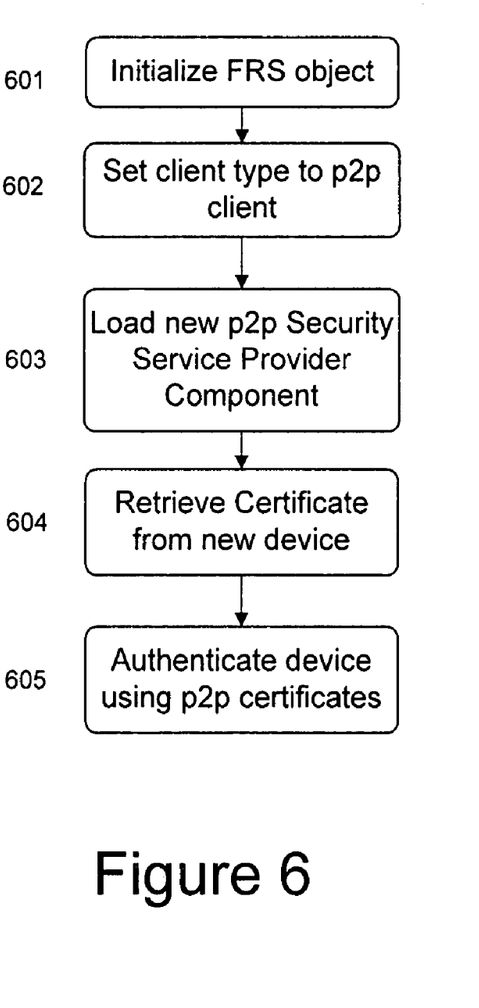
FIG. 6 illustrates a block diagram of a process for enabling an existing FRS component to use peer-to-peer functionality.

In a peer-to-peer network, nodes may be associated with devices that are not on the same domain. In an embodiment of the claimed method and system, an existing FRS component, such as the one discussed above, may be adapted for use with a peer-to-peer network based application by enabling devices associated with peer nodes to connect without relying on domain authentication. This may require using a security model different from the account based security integrated with a network directory service. As illustrated in FIG. 6, after initializing an FRS component 601, instead of using a domain or user-based authentication, FRS may be modified to use a peer-to-peer authentication process. In this embodiment, an FRS parameter may be modified to use a new p2p client type 602, instead of a domain. The client type, or replica set type, signals the FRS service to load a new security service provider (SSP) component 603, e.g., a peer-to-peer SSP (p2p SSP). This p2p SSP may enable FRS to authenticate based on peer-to-peer network certificates, instead of other credentials (e.g., domain credentials). FRS may be made to rely on p2p certificates to authenticate the users 604, 605 and rely on the p2p functionality to determine whether a device, or node, has rights to access the replication files. This new SSP may enable an FRS device associated with a p2p node to authenticate between domains or without having to setup a domain. In a windows embodiment, the replicaset type may be configured using Windows management instrumentation (WMI).

As discussed above, the FRS component may manage a set of direct connections with other devices either upstream or downstream from it depending on the network topology. For a given number of devices or nodes, the replication topology may take on a number of different forms (e.g., ring, hub and spoke, etc.). These topologies may be based on manual configurations or ad hoc configurations. However, manually creating a topology does not provide a convenient, dynamic process for configuring a replication service for use with a p2p application and may require administrator assistance. Moreover, an ad hoc configuration may not enable an application connected using a p2p schema to replicate in an efficient manner because change orders may take different paths than p2p message communications in other portions of the same application. Therefore, an ad hoc topology may not be efficient when different portions of the application are communicating in a completely different manner. In one embodiment, the FSP may act as an FRS topology builder that synchronizes the FRS connections and the p2p connections, thereby enabling FRS replication signals to propagate in a manner similar to the communication messages of the other parts of the application (e.g., using p2p).

Figure 7:
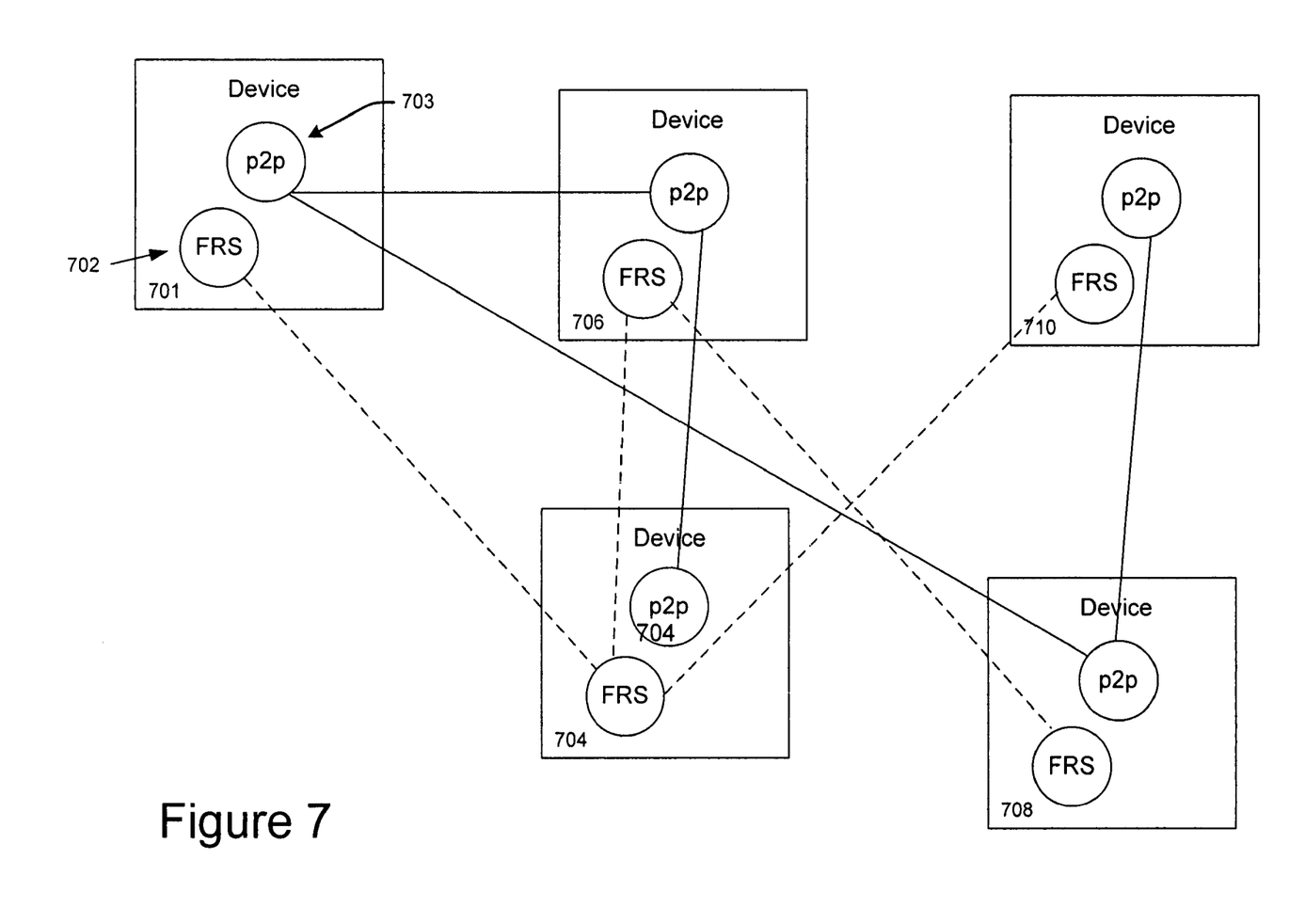
FIG. 7 illustrates an application using a file replication service component of an operating system and a peer-to-peer functionality component without synchronization.

An example of unsynchronized topologies is illustrated in FIG. 7, where a replication connection topology is different from the topology of p2p connections. A first node represented by device 701 may contain a p2p component 702 and an FRS component 703. Device 701 may have direct p2p connections to device 706 and device 708. Although replication signals will eventually propagate through indirect connections to the other devices, unlike the p2p connections, device 701 only has a single direct FRS connection to device 704. Thus, a replication signal will propagate differently from a p2p message. Because a general application, such as a meeting application, may include communication using a p2p topology different from the FRS replication topology, an embodiment of the claimed method and system configures the FRS topology to correspond to the p2p topology for the application, as described further below.

Figure 8:
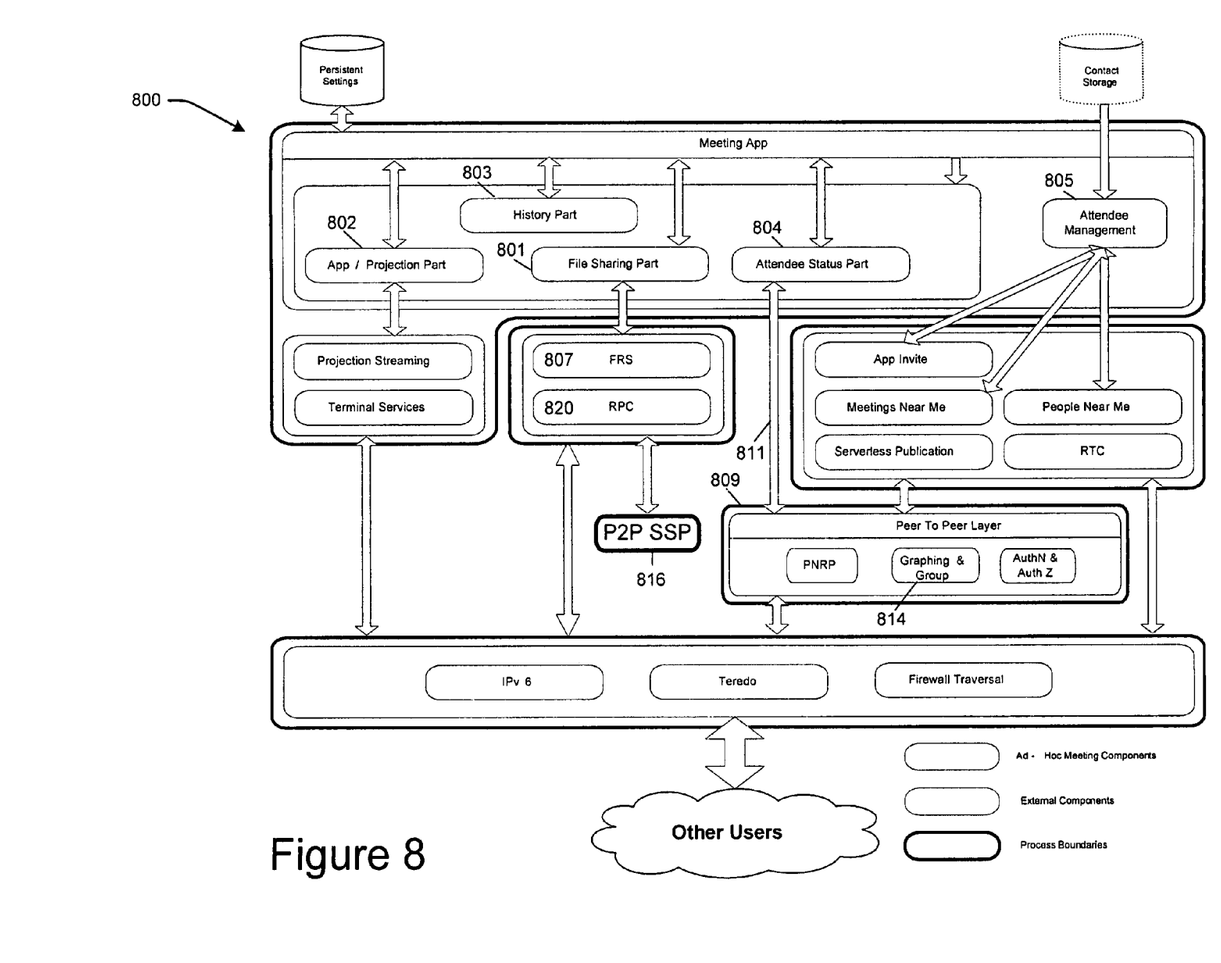
FIG. 8 illustrates an architecture diagram of a meeting application embodiment.

A meeting application embodiment of the claims is illustrated in FIG. 8. The meeting application 800 may contain several different parts or components (801, 802, 803, 804, 805) including a file sharing part (FSP) 801. As illustrated in FIG. 8, the FSP 801 of a meeting application 800 is used to couple to a native FRS component 807 of an operating system, such as Windows, and to a p2p component layer 809. In this embodiment, the file sharing part (FSP) 801 may have a separate connection 811 (e.g., via the meeting application 800) to a peer group (e.g., a subset of p2p nodes created for a particular meeting) via the p2p component 809. The FSP 801 may query the graphing and grouping function 814 of the p2p component to discover p2p topology information. The FSP 801 then relays this topology information to the FRS 807 which configures its own FRS topology. As illustrated in FIG. 8, the FRS may use a p2p SSP 816 in order to authenticate and validate a list of nodes associated with the topology information. This p2p SSP 816 may be a part of the p2p layer 809 or a stand alone component. The FRS 807 then establishes connections to the list of nodes based on the topology information. The FRS 807 may communicate using different protocols than the p2p layer 809.

Figure 9:
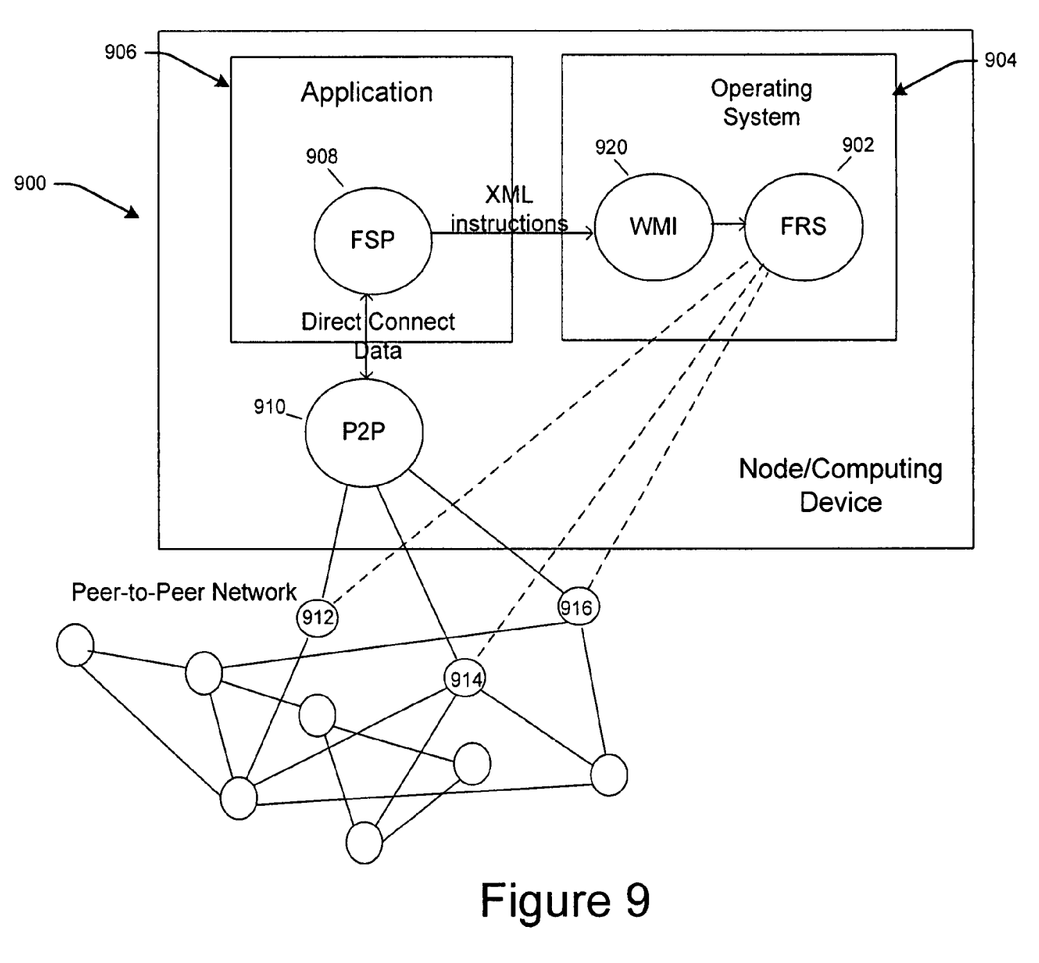
FIG. 9 illustrates an embodiment of the claimed system using the meeting application of FIG. 8.

FIG. 9 further illustrates a topology for an embodiment of the claimed system. A computing device 900 may represent a first node of several nodes/members/devices 901 that are participating in a meeting. The computing device may have an FRS component 902 that is native to an operating system 904. An application 906 may include an FSP 908 that is coupled to a p2p component 910 and the FRS component 902. The FSP 908 may retrieve topology information from the p2p component 910, which may include a list of neighbor nodes. Neighbor nodes may represent other nodes, such as 912-916, in the p2p network that are directly connected to the first node. A peer group may include the subset of directly connected neighbor nodes, e.g., 912-916. The FSP 908 then relays this information to the FRS 902 which configures its FRS topology to correspond to the p2p topology. The neighbor nodes 912-916 may be configured with the same internal components as the first node 900 and configure their FRS connections similarly. Thus, if each node configures its direct connections similarly to the p2p connections, the FRS topology will correspond to the p2p topology.

In a Windows operating system environment, one embodiment of the claims uses Windows Management Instrumentation (WMI) 920 to configure the FRS 902. WMI 920 may be an native operating system component. In this embodiment, WMI 920 takes instructions from FSP 908 in the form of Extensible Markup Lanugage (XML) strings. The information sent via the XML may include a replica set, a content set, and peer group member information. In short, FSP 908 may communicate with the p2p API 910 to obtain a list of neighbor nodes 912-916 and provide this list to FRS 902, via WMI 920, so that FRS 920 can configure a replica set based on the list of neighbor nodes. FRS then provides the necessary replication functionality between the replica set and operates in its normal manner to replicate. The FRS functionality may be completely independent from the p2p portion of the meeting application, e.g., it may not need to use any p2p functionality to replicate after the topology is configured based on the p2p information.

Note that a single node (or machine) of the p2p network does not necessarily need to store the topology information for the entire peer group and thus, neither does the FRS component. This is because replication functionality operates to propagate changes similar to flooding in a p2p multicasting network, e.g., using intermediary nodes to relay changes and/or messages. In this case, the FRS topology only needs to provide a pathway in which each node can eventually receive change orders, e.g., updates to replicated data. Thus, the FRS replication topology may be synchronized with the p2p topology by directing each FRS component of each node to create direct connections to neighbor nodes of the overlaying p2p network. The FRS may use its own communication protocol, e.g., using RPC 820 in a windows application embodiment, to establish links without the use of the p2p network. The FRS may only need to be given a list of neighbor nodes (including credentials such as an IP address of a node, a meeting ID, and group membership certificate) in which to connect. When FRS creates these direct connections, replication signals originating from one peer node will eventually be propagated (or "flooded") to other peer nodes. FRS need only be concerned with the more immediate topology of its p2p neighbor nodes.

Another function of peer-to-peer components may be group member updating. For example, whenever a node is added to or removed from a p2p group, an update message may be transmitted to neighbor nodes to inform the nodes of topology changes. This update information is useful for synchronizing the FRS replication topology as well. In short, the FRS topology may be continually updated and reconfigured using the FSP whenever p2p graph changes are detected. In this manner, the FRS topology is grown or pruned accordingly, and the operation of the general meeting application is undisturbed by changes in membership.

Figure 10:
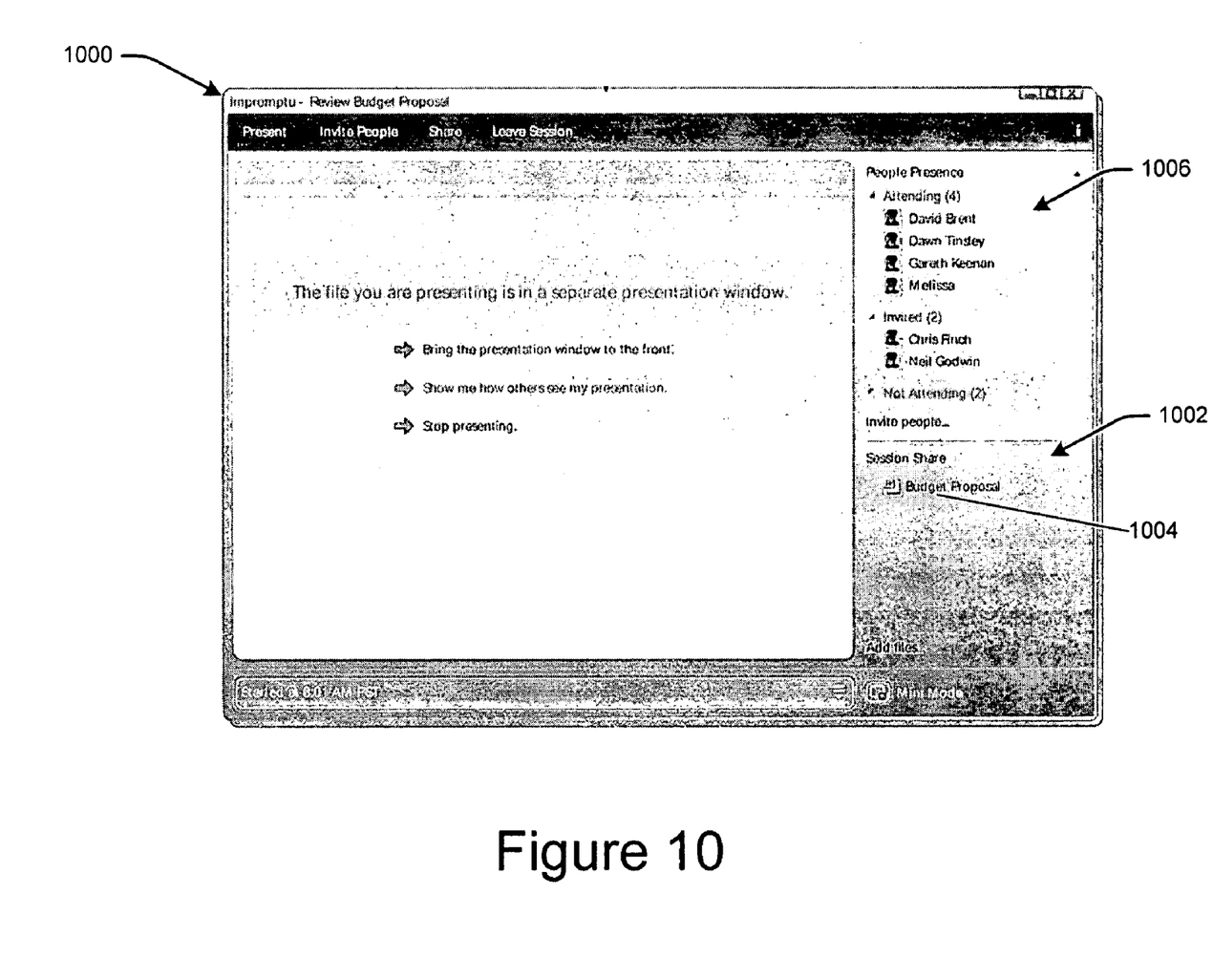
FIG. 10 illustrates a screen shot of a share window of the meeting application of FIG. 8.

FIG. 10 illustrates a screen shot of a meeting application embodiment 1000. A share window 1002 is shown that illustrates a single file 1004 being shared by all participants of the meeting. The meeting application 1000 uses the claimed method and system described to update the replicated file 1004 across the machines of each meeting participant 1006. Because the topology of the replication system and meeting message system is aligned, data is synchronized between message propagation and data replication. Thus, when a particular group member 1006 sends a message to the group discussing a change to contents of the share 1002, message propagation will be synchronized with share updates.

Leveraging an existing native operating system component to provide a meeting application with replication functionality may eliminate the need to generate any new replication functionality code. Additionally, the claimed method and system enables FRS components that use domains and network authentication services to instead use p2p security to establish a replication topology. This further allows FRS components to efficiently work with a p2p network without the need for a network administrator to constantly create a new domain each time a general application, such as a meeting application, needs to create a p2p group to execute the application. Moreover, the claimed method and system provides a topology builder to direct the replication component to create communication pathways synchronized with nodes of a peer-to-peer network, e.g., the replication service component is configured to build a topology having direct connections to neighbor nodes as defined by the peer-to-peer network. Because replication functionality may propagate data changes via specific paths, the topology synchronization will align replication signal propagation with other communication flows (e.g., meeting messages) of the general application. For example, in the meeting application embodiment, a first participant may transmit a message regarding a data change in a replicated folder. By aligning the underlying plumbing of the FRS, the data change may propagate in a similar manner to the message flooding. In this manner, changes to replicated data may mirror meeting dialogue notifications. An ad hoc FRS connection topology may be less likely to provide this efficiency.

The invention claimed is:

1. A computing device corresponding to a first node in a peer-to-peer network, comprising:
   a peer-to-peer functionality object comprising peer-to-peer network functionality configured to:
      authenticate, via a peer-to-peer authentication process using peer-to-peer network certificates, a set of other nodes in the peer-to-peer network; and
      communicate, using a first protocol and via a peer-to-peer topology, with the peer-to-peer authenticated set of other nodes, the peer-to-peer topology comprising a set of peer-to-peer connections between the computing device and the set of other nodes;
   a file replication service component native to an operating system of the computing device, the file replication service component configured to:
      authenticate, via a domain or user-based authentication different from the peer-to-peer authentication process, the set of other nodes;
      communicate, using a second protocol different from the first protocol and via a first file replication service topology, with the domain or user-based authenticated set of other nodes, the first file replication service topology comprising a first set of direct connections between the computing device and the set of other nodes, and the first set of direct connections being different from the set of peer-to-peer connections;
      configure a client type of the file replication service component to be a peer-to-peer client type based upon peer-to-peer topology information received from a file sharing part;
      configure, based on the peer-to-peer topology information received from the file sharing part, a second file replication service topology, the second file replication service topology comprising a second set of direct connections different from the first set of direct connections, a level of synchronization between the second file replication service topology and the peer-to-peer topology is greater than a level of synchronization between the first file replication service topology and the peer-to-peer topology; and
      initiate a replication of a file, using the second protocol and via the second file replication service topology, across the set of other nodes that have been authenticated by the file replication service using the peer-to-peer network certificates;
   the file sharing part is part of an application of the computing device configured to:
      query the peer-to-peer functionality object for-peer-to-peer topology information; and
      provide the peer-to-peer topology information to the file replication service component; and
   a peer-to-peer security service provider component loaded onto the computing device by the file replication service component based on the peer-to-peer client type, the peer-to-peer security service configured to authenticate nodes on behalf of the file replication service component by using peer-to-peer network certificates instead of by using the domain or user-based authentication,
   at least some of at least one of the peer-to-peer functionality object, the file replication service component, and the file sharing part residing on the computing device corresponding to the first node of the peer-to-peer network.

2. The computing device of claim 1, the peer-to-peer topology information comprising a list of neighbor nodes in the peer-to-peer network that are logically connected to the first node, the file replication service component configured to configure the second file replication service topology by establishing a direct connection with respective neighbor nodes on the list of neighbor nodes.

3. The computing device of claim 2, respective neighbor nodes on the list of neighbor nodes comprising an IP address of a different neighbor node, a meeting identifier, and a group membership certificate.

4. The computing device of claim 1, the file sharing part configured to provide the peer-to-peer topology to the file replication service component in an XML format.

5. The computing device of claim 1, the application comprising a general meeting application adapted to establish communication using the peer-to-peer network.

6. The computing device of claim 1, comprising:
updating the second file replication service topology when the peer-to-peer topology changes.

7. A non-signal computer-readable storage medium having computer-executable instructions for performing operations comprising:
  initializing a file replication service component native to an operating system of a first computing device in a peer-to-peer network;
  authenticating, by the file replication service component, via a domain or user-based authentication different from a peer-to-peer authentication process, a set of other nodes in the peer-to-peer network;
  communicating, by the file replication service component, using a first protocol via a first file replication service topology, with the domain or user-based authenticated set of other nodes, the first file replication service topology comprising a first set of direct connections between the first computing device and the set of other nodes;
  configuring a client type of the file replication service component to be a peer-to-peer client type;
  creating a peer-to-peer functionality object on the first computing device that comprises peer-to-peer network functionality enabling the first computing device to interact with the peer-to-peer network, the peer-to-peer functionality object configured to;
    authenticate, via the peer-to-peer authentication process using peer-to-peer network certificates, the set of other nodes; and
    communicate, using a second protocol and via a peer-to-peer topology, with the peer-to-peer authenticated set of other nodes, the peer-to-peer topology comprising a set of peer-to-peer connections between the computing device and the set of other nodes, and the set of peer-to-peer connections being different from the first set of direct connections;
  creating a file sharing part within an application on the first computing device, the file sharing part communicatively coupled to the file replication service component and to the peer-to-peer functionality object;
  querying, by the file sharing part, peer-to-peer node topology information from the peer-to-peer functionality object;
  providing, by the file sharing part, the peer-to-peer topology information to the file replication service component;
  loading, by the file replication service component onto the first computing device and based on the peer-to-peer client type, a peer-to-peer security service provider component, the peer-to-peer security service provider component in communicative connection with the file replication service component;
  authenticating, by the file replication service component via the peer-to-peer security service provider component by using peer-to-peer network certificates instead of using the domain or user-based authentication, the set of other nodes in the peer-to-peer network; and
  configuring, by the file replication service component based on the peer-to-peer node topology information provided by the file sharing part, a second file replication service topology for use by the file replication service component to establish, using the first protocol, a network of file replication connections to neighbor nodes of the first computing device in the set of other nodes, the second file replication service topology comprising a second set of direct connections different from the first set of direct connections, a level of synchronization between the second file replication service topology and the peer-to-peer topology is greater than a level of synchronization between the first file replication service topology and the peer-to-peer topology.

8. The non-signal computer-readable storage medium of claim 7, the configuring the second file replication service topology comprising transmitting data comprising a meeting identifier, a group membership certificate, and a list of neighbor node IP addresses.

9. The non-signal computer-readable storage medium of claim 8, the file sharing part comprised in a meeting application and the list of neighbor node IP addresses comprising addresses of the neighbor nodes of the first computing device in the peer-to-peer network.

10. The non-signal computer-readable storage medium of claim 9, comprising: establishing, by the file replication service component, direct file replication connections with devices associated with the list of neighbor node IP addresses.

11. The non-signal computer-readable storage medium of claim 7, comprising updating the file replication topology.

12. The non-signal computer-readable storage medium of claim 11, the updating the file replication topology comprising:
  alerting the neighbor nodes of the first computing device of a topology change via the peer-to-peer network and relaying the topology change to the file sharing part; and
  re-configuring, by the file sharing part, the file replication topology based on the topology change.

13. The non-signal computer-readable storage medium of claim 7, the providing, by the file sharing part, the peer-to-peer topology information comprising providing, by the file sharing part, the peer-to-peer topology information in an XML (Extensible MarkUp Language) format.

14. A method of configuring a file replication service component on a first computing device corresponding to a first node in a peer-to-peer network, the method comprising:
  authenticating, by the file replication service component native to the first computing device, a set of other nodes in the peer-to-peer network using a non-peer-to-peer authentication process;
  communicating, by the file replication service component, using a first protocol via a first file replication service topology, with the non-peer-to-peer authenticated set of other nodes;
  configuring a client type of the file replication service component to be a peer-to-peer client type;
  creating a peer-to-peer functionality object on the first computing device that comprises peer-to-peer network functionality enabling the first computing device to interact with the peer-to-peer network, the peer-to-peer functionality object configured to:
    authenticate, via a peer-to-peer authentication process using peer-to-peer network certificates, the set of other nodes; and
    communicate, using a second protocol and via a peer-to-peer topology, with the peer-to-peer authenticated set of other nodes, the peer-to-peer topology comprising a set of peer-to-peer connections different from a first set of direct connections of the first file replication service topology;

retrieving, by a file sharing part, peer-to-peer node topology information from the peer-to-peer functionality object;

providing, by the file sharing part, the peer-to-peer topology information to the file replication service component;

loading a peer-to-peer security service provider component based on the peer-to-peer client type;

authenticating, by the file replication service component via the peer-to-peer security service provider component by using peer-to-peer network certificates instead of using the non-peer-to-peer authentication, the set of other nodes in the peer-to-peer network; and configuring, by the file replication service component based on the peer-to-peer topology information provided by the file sharing part, a second file replication service topology for use by the file replication service component to establish, using the first protocol, a network of file replication connections to neighbor nodes of the first computing device in the set of other nodes, the second file replication service topology comprising a second set of direct connections different from the first set of direct connections of the first file replication service topology.

15. The method of claim 14, the retrieving peer-to-peer topology information from the peer-to-peer functionality object comprising querying the peer-to-peer functionality object for a list of neighbor nodes.

16. The method of claim 15, comprising configuring an existing file replication service object to establish the network of file replication service connections, comprising establishing a direct file replication service connection with respective each nodes on the list of neighbor nodes.

17. The method of claim 14, comprising pushing updates of the peer-to-peer node topology information by the peer-to-peer functionality object to the file sharing part and re-configuring, by the file sharing part, the file replication service component based on the updates.

18. The method of claim 14, the peer-to-peer topology information at least partially in XML format.

* * * * *

UNITED STATES PATENT AND TRADEMARK OFFICE
CERTIFICATE OF CORRECTION

PATENT NO. : 8,108,548 B2
APPLICATION NO. : 11/316073
DATED : January 31, 2012
INVENTOR(S) : Dan Teodosiu et al.

It is certified that error appears in the above-identified patent and that said Letters Patent is hereby corrected as shown below:

In column 10, line 42, in Claim 1, after "for" delete "-".

Signed and Sealed this
Twenty-seventh Day of March, 2012

David J. Kappos
*Director of the United States Patent and Trademark Office*